C. W. DILKS.
PISTON PACKING.
APPLICATION FILED MAY 28, 1915.
1,172,518.
Patented Feb. 22, 1916.
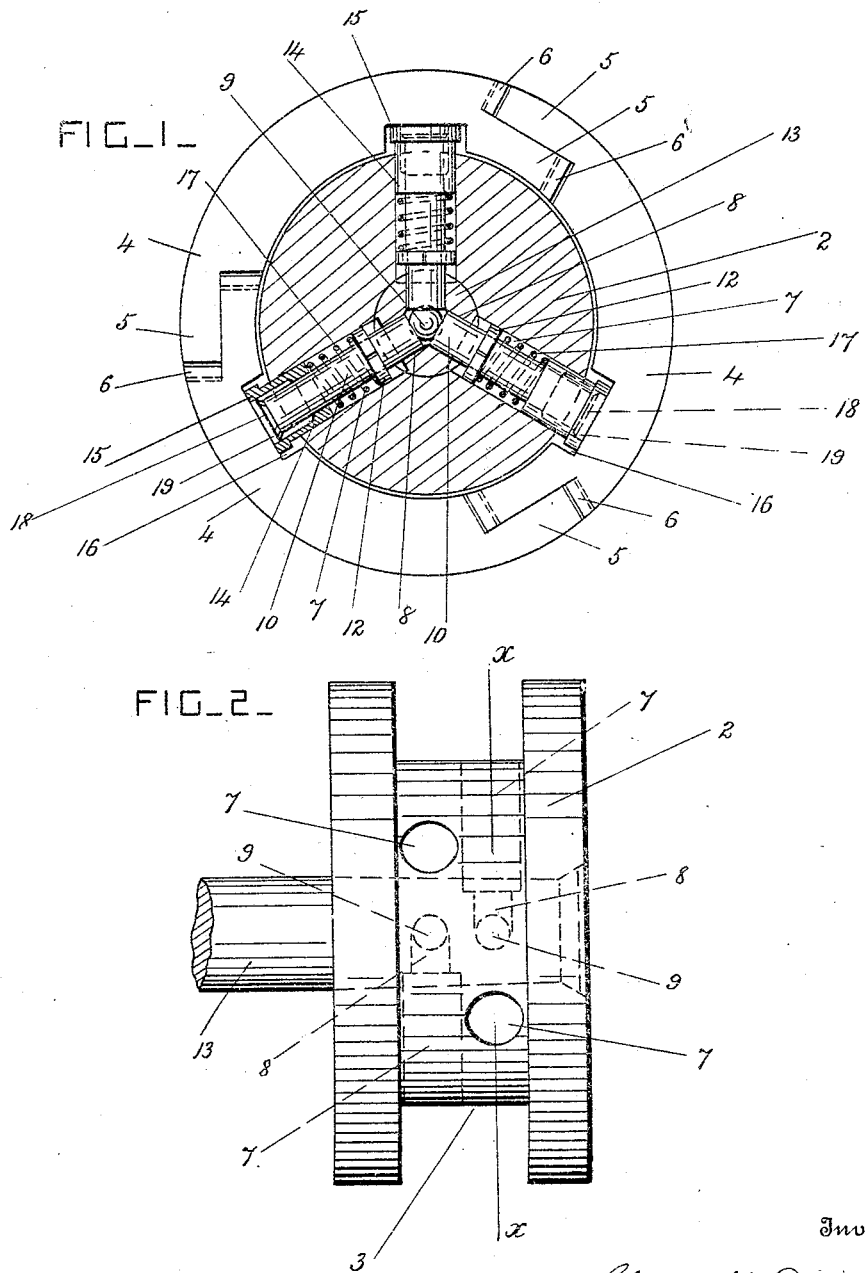
Inventor
Charles W. Dilks
By Herbert W. T. Jenner.
Attorney

UNITED STATES PATENT OFFICE.

CHARLES W. DILKS, OF PLAINFIELD, NEW JERSEY.

PISTON-PACKING.

1,172,518. Specification of Letters Patent. Patented Feb. 22, 1916.

Application filed May 28, 1915. Serial No. 30,979.

*To all whom it may concern:*

Be it known that I, CHARLES W. DILKS, a citizen of the United States, residing at Plainfield, in the county of Union and State of New Jersey, have invented certain new and useful Improvements in Piston-Packing; and I do hereby declare the following to be a full, clear, and exact description of the invention, such as will enable others skilled in the art to which it appertains to make and use the same.

This invention relates to metallic packing for the pistons of engine and other cylinders; and it consists in the novel construction and combination of the parts hereinafter fully described and claimed.

In the drawings, Figure 1 is a cross-section through a piston constructed according to this invention, taken on the line $x$—$x$ in Fig. 2. Fig. 2 is a side view of the piston with the packing segments removed.

The piston 2 is of any approved construction having a circumferential groove 3, and the piston-rod 13 is secured to it in any approved way.

The packing consists of metallic segments 4 having overlapping end portions 5, and the ends 6 of these end portions are also preferably beveled so as to assist in making the packing segments satisfactory. The packing may however be made in any other approved way. Three packing segments are preferably used.

Spring chambers 7 are formed in the piston, and are arranged radially of its center and at equal distances apart. Three spring chambers 7 are preferably arranged in one plane. Guide holes 8 are formed at the bottom ends of the spring chambers, and are connected together at the center line of the piston. A ball 9 is arranged on the center line of the piston and is slidable in each of the holes 8. Pressure pins 10 are arranged to slide in the guide holes 8, and they project through the spring chambers. Each pressure pin 10 has a collar 12 secured on it near the bottom of its spring chamber and slidable therein. Each pin 10 has also an abutment sleeve 14 which is slidable on its free end portion. One end portion of the abutment sleeve projects from the spring chamber, and it has a flange or enlargement 15 which bears against one of the packing segments. The enlargement increases the surface which bears against the segment, and the segment preferably has a notch 16 to accommodate the enlargement. A helical spring 17 is arranged in the spring chamber around each pin, between its collar and abutment sleeve, and this spring presses the enlargement of the sleeve outwardly against the packing segment. Each pin 10 preferably has a head or stop 18 on its free end which slides in a counterbore 19 in the sleeve. This head is provided to retain the sleeve on the pin.

The ball is dropped in place through one of the guide holes, and is free to move radially in all directions around the center line of the piston. The ends of the guide pins are cupped so as to engage with the spherical surface of the ball, and the ball automatically equalizes the outward pressure of the springs. The ball and other parts interposed between the inner ends of the springs form compensating devices which permit the segments to move back and forth radially. Each segment moves independently of the others, but any movement of any segment in one direction is attended by a movement of the other segments but in a different direction. This enables the segments to be moved outwardly by the springs so as to compensate for unequal wear.

A single series of three spring-pressed abutment sleeves may be used, or as shown in Fig. 2, two similar series may be provided. When more than one series of spring-pressed sleeves is provided the guide-pins and the springs of one series are arranged in staggered relation to the guide-pins and the springs of the adjacent series.

When the end portion of the piston-rod is secured in the piston, as shown, it is considered as being a part of the piston, and the guide holes and chambers are formed in it, but if desirable the piston-rod can be secured to the piston in any other approved way, so that the guide holes may be formed in the solid metal of the piston.

What I claim is:

1. A piston provided with radial chambers, packing segments, springs arranged in the said chambers and pressing the packing segments outwardly, and compensating devices arranged between the inner ends of the springs and operating to automatically equalize their outward pressure on the packing segments.

2. A piston provided with radial chambers, packing segments, springs arranged in the said chambers and pressing the packing segments outwardly, a ball arranged centrally in the piston, and slidable pressure pins bearing against the said ball and operatively connected with the said springs and operating to automatically equalize their outward pressure on the packing segments.

3. A piston provided with radial chambers arranged in two series, the chambers of one series being arranged in a plane parallel to and in staggered relation to the chambers of the other series, packing segments, springs arranged in the said chambers and pressing the packing segments outwardly, and compensating devices arranged between the inner ends of the springs pertaining to each series of chambers and operating to automatically equalize the spring pressure on the packing segments.

4. A piston provided with radial guide holes and chambers, pressure pins slidable in the guide holes and having collars arranged in the said chambers, abutment sleeves slidable in the chambers, springs interposed between the said sleeves and collars, packing segments bearing against the abutment sleeves, and a ball arranged between the inner ends of the said pins at the center line of the piston and operating to automatically equalize the pressure of the springs on the packing segments.

5. A piston provided with radial chambers, slidable pressure pins having collars arranged in the chambers and having stops at their outer ends, abutment sleeves slidable on the pins and having counterbores for the stops to slide in, springs interposed between the said collars and sleeves, packing segments bearing against the abutment sleeves, and a ball arranged between the inner ends of the pressure pins at the center line of the piston and operating to automatically equalize the pressure of the springs on the packing segments.

In testimony whereof I have affixed my signature.

CHARLES W. DILKS.